(12) United States Patent
Moskowitz et al.

(10) Patent No.: US 9,231,980 B2
(45) Date of Patent: *Jan. 5, 2016

(54) SECURE PERSONAL CONTENT SERVER

(71) Applicant: BLUE SPIKE, INC., Sunny Isles Beach, FL (US)

(72) Inventors: Scott A. Moskowitz, Ft. Lauderdale, FL (US); Mike W. Berry, Seattle, WA (US)

(73) Assignee: WISTARIA TRADING LTD, Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/256,315

(22) Filed: Apr. 18, 2014

(65) Prior Publication Data

US 2014/0282858 A1    Sep. 18, 2014

Related U.S. Application Data

(63) Continuation of application No. 13/796,538, filed on Mar. 12, 2013, now Pat. No. 8,789,201, which is a continuation of application No. 13/413,691, filed on Mar. 7, 2012, now Pat. No. 8,739,295, which is a (Continued)

(51) Int. Cl.
| | |
|---|---|
| *H04L 29/06* | (2006.01) |
| *G06F 21/10* | (2013.01) |
| *H04N 7/167* | (2011.01) |
| *H04N 21/418* | (2011.01) |

(Continued)

(52) U.S. Cl.
CPC ............... *H04L 63/20* (2013.01); *G06F 21/10* (2013.01); *H04L 67/02* (2013.01); *H04N 7/1675* (2013.01); *H04N 21/4181* (2013.01); *H04N 21/4183* (2013.01); *H04N 21/4627* (2013.01); *H04N 21/8358* (2013.01); *G06F 2221/0706* (2013.01); *G06F 2221/0733* (2013.01)

(58) Field of Classification Search
None
See application file for complete search history.

(56) References Cited

U.S. PATENT DOCUMENTS 5,341,429 A * 8/1994 Stringer et al. .................. 705/52
5,513,126 A * 4/1996 Harkins et al. ................ 709/228

(Continued)

OTHER PUBLICATIONS

Yu, Che-Fn. Access Control and Authorization Plan for Customer Control of Network Services. IEEE GLOBECOM 1989. Pub. Date: 1989. Relevant pp. 862-869. http://ieeexplore.ieee.org/stamp/stamp.jsp?tp=&arnumber=64085.*

(Continued)

*Primary Examiner* — Jeremiah Avery
(74) *Attorney, Agent, or Firm* — Neifeld IP Law, PC

(57) ABSTRACT

A local content server system (LCS) for creating a secure environment for digital content is disclosed, which system comprises: a communications port in communication for connecting the LCS via a network to at least one Secure Electronic Content Distributor (SECD), which SECD is capable of storing a plurality of data sets, is capable of receiving a request to transfer at least one content data set, and is capable of transmitting the at least one content data set in a secured transmission; a rewritable storage medium whereby content received from outside the LCS may be stored and retrieved; a domain processor that imposes rules and procedures for content being transferred between the LCS and devices outside the LCS; and a programmable address module which can be programmed with an identification code uniquely associated with the LCS. The LCS is provided with rules and procedures for accepting and transmitting content data.

13 Claims, 10 Drawing Sheets

Related U.S. Application Data continuation of application No. 12/287,443, filed on Oct. 9, 2008, now Pat. No. 8,171,561, which is a continuation of application No. 10/049,101, filed as application No. PCT/US00/21189 on Aug. 4, 2000, now Pat. No. 7,475,246.

(60) Provisional application No. 60/147,134, filed on Aug. 4, 1999, provisional application No. 60/213,489, filed on Jun. 23, 2000.

(51) Int. Cl.
*H04N 21/4627* (2011.01)
*H04N 21/8358* (2011.01)
*H04L 29/08* (2006.01)

(56) References Cited

U.S. PATENT DOCUMENTS

| | | | | |
|---|---|---|---|---|
| 5,657,461 A * | 8/1997 | Harkins et al. | ............ | 715/733 |
| 5,754,938 A * | 5/1998 | Herz et al. | ............ | 725/116 |
| 5,818,818 A * | 10/1998 | Soumiya et al. | ............ | 370/252 |
| 5,842,213 A * | 11/1998 | Odom et al. | ............ | 707/999.1 |
| 5,862,260 A * | 1/1999 | Rhoads | ............ | 382/232 |
| 6,029,195 A * | 2/2000 | Herz | ............ | 725/116 |
| 6,148,333 A * | 11/2000 | Guedalia et al. | ............ | 709/219 |
| 6,226,618 B1 * | 5/2001 | Downs et al. | ............ | 705/51 |
| 6,263,313 B1 * | 7/2001 | Milsted et al. | ............ | 705/50 |
| 6,385,596 B1 * | 5/2002 | Wiser et al. | ............ | 705/51 |
| 6,389,403 B1 * | 5/2002 | Dorak, Jr. | ............ | 705/52 |
| 6,389,538 B1 * | 5/2002 | Gruse et al. | ............ | 713/194 |
| 6,480,963 B1 * | 11/2002 | Tachibana et al. | ............ | 726/4 |
| 6,510,513 B1 * | 1/2003 | Danieli | ............ | 713/156 |
| 6,522,769 B1 * | 2/2003 | Rhoads et al. | ............ | 382/100 |
| 6,587,837 B1 * | 7/2003 | Spagna et al. | ............ | 705/52 |
| 6,931,534 B1 * | 8/2005 | Jandel et al. | ............ | 713/176 |
| 6,950,941 B1 * | 9/2005 | Lee et al. | ............ | 713/193 |
| 6,957,330 B1 * | 10/2005 | Hughes | ............ | 713/163 |
| 6,966,002 B1 * | 11/2005 | Torrubia-Saez | ............ | 726/29 |
| 7,093,295 B1 * | 8/2006 | Saito | ............ | 726/26 |
| 7,233,948 B1 * | 6/2007 | Shamoon et al. | ............ | 348/E5.004 |
| 7,672,317 B2 * | 3/2010 | Gateva et al. | ............ | 370/401 |
| 8,095,949 B1 * | 1/2012 | Hendricks et al. | ............ | 725/29 |

OTHER PUBLICATIONS

Jaeger, Trent; Prakash, Atul; Rubin, Aviel D. A System Architecture for Flexible Control of Downloaded Executable Content. Proceedings of the Fifth International Workshop on Object-Orientation in Operating Systems. Pub. Date: 1996. Relevant pp. 14-18. http://ieeexplore.ieee.org/stamp/stamp.jsp?tp=&arnumber=557855.* von Faber, Eberhard; Hammelrath, Robert; Heider, Franz-Peter. The Secure Distribution of Digital Contents. Proceedings, 13th Annual Computer Security Applications Conference. Pub. Date: 1997. Relevant pp. 16-22. http://ieeexplore.ieee.org/stamp/stamp.jsp?tp=&arnumber=646169.*

Lacy, Jack; Snyder, James H.; Maher, David P. Music on the Internet and the Intellectual Property Protection Problem. Proceedings of the IEEE International Symposium on Industrial Electronics, 1997. ISIE '97. vol. 1. pp. SS77-SS83. http://ieeexplore.ieee.org/stamp/stamp.jsp?tp=&arnumber=651739.*

Kohl, Ulrich; Lotspiech, Jeffrey; Nusser, Stefan. Security for the Digital Library—Protecting Documents Rather Than Channels. Proceedings, Ninth International Workshop on Database and Expert Systems Applications. Pub. Date: 1998. pp. 316-321. http://ieeexplore.ieee.org/stamp/stamp.jsp?tp=&arnumber=707419.*

* cited by examiner

SECURE PERSONAL CONTENT SERVER

CROSS REFERENCE TO RELATED APPLICATIONS

This application is a continuation of U.S. application Ser. No. 13/796,538, filed Mar. 12, 2013, which is a continuation of application Ser. No. 13/413,691, filed Mar. 7, 2012, which is a continuation of U.S. application Ser. No. 12/287,443, filed Oct. 9, 2008, which issued as U.S. Pat. No. 8,171,561 on May 1, 2012, which is a continuation of U.S. application Ser. No. 10/049,101, which issued as U.S. Pat. No. 7,475,246 on Jan. 6, 2009, which entered the US national stage Jul. 23, 2002, which is a national stage entry of PCT/US00/21189, filed Aug. 4, 2000, which claims the benefit of U.S. Patent Application No. 60/147,134, filed Aug. 4, 1999, entitled, "A Secure Personal Content Server" and U.S. Patent Application No. 60/213,489, filed Jun. 23, 2000, entitled "A Secure Personal Content Server." The contents of U.S. application Ser. No. 13/796,538, filed Mar. 12, 2013, U.S. application Ser. No. 13/413,691, filed Mar. 7, 2012, U.S. application Ser. No. 12/287,443, filed Oct. 9, 2008, and U.S. application Ser. No. 10/049,101, filed Jul. 23, 2002, are incorporated by reference in their entirety.

FIELD OF INVENTION

The present invention relates to the secure distribution of digitized value-added information, or media content, while preserving the ability of publishers to make available unsecured versions of the same value-added information, or media content, without adverse effect to the systems security.

Authentication, verification and authorization are all handled with a combination of cryptographic and steganographic protocols to achieve efficient, trusted, secure exchange of digital information.

This application also incorporates by reference the following applications: pending U.S. patent application Ser. No. 08/999,766, filed Jul. 23, 1997, entitled "Steganographic Method and Device"; pending U.S. patent application Ser. No. 08/772,222, filed Dec. 20, 1996, entitled "Z-Transform Implementation of Digital Watermarks" (issued as U.S. Pat. No. 6,078,664); pending U.S. patent application Ser. No. 09/456,319, filed Dec. 8, 1999, entitled "Z-Transform Implementation of Digital Watermarks" (issued as U.S. Pat. No. 6,853,726); pending U.S. patent application Ser. No. 08/674,726, filed Jul. 2, 1996, entitled "Exchange Mechanisms for Digital Information Packages with Bandwidth Securitization, Multichannel Digital Watermarks, and Key Management" (issued as U.S. Pat. No. 7,362,775); pending U.S. patent application Ser. No. 09/545,589, filed Apr. 7, 2000, entitled "Method and System for Digital Watermarking" (issued as U.S. Pat. No. 7,007,166); pending U.S. patent application Ser. No. 09/046,627, filed Mar. 24, 1998, entitled "Method for Combining Transfer Function with Predetermined Key Creation" (issued as U.S. Pat. No. 6,598,162); pending U.S. patent application Ser. No. 09/053,628, filed Apr. 2, 1998, entitled "Multiple Transform Utilization and Application for Secure Digital Watermarking" (issued as U.S. Pat. No. 6,205,249); pending U.S. patent application Ser. No. 09/281,279, filed Mar. 30, 1999, entitled "Optimization Methods for the Insertion, Protection, and Detection . . . " (issued as U.S. Pat. No. 6,522,767); U.S. patent application Ser. No. 09/594,719, filed Jun. 16, 2000, entitled "Utilizing Data Reduction in Steganographic and Cryptographic Systems" (issued as U.S. Pat. No. 7,123,718) (which is a continuation-in-part of PCT application No. PCT/US00/06522, filed 14 Mar. 2000, which PCT application claimed priority to U.S. Provisional Application No. 60/125,990, filed 24 Mar. 1999); and U.S. patent application Ser. No. 09/731,040, entitled "Systems, Methods and Devices for Trusted Transactions," filed Dec. 7, 2000 (issued as U.S. Pat. No. 7,159,116) which claimed priority to U.S. Application No. 60/169,274, filed Dec. 7, 1999, entitled "Systems, Methods And Devices For Trusted Transactions." All of the patent applications previously identified in this paragraph are hereby incorporated by reference, in their entireties, as if fully stated herein.

BACKGROUND OF THE INVENTION

The music industry is at a critical inflection point. Digital technology enables anyone to make perfect replica copies of musical recordings from the comfort of their home, or as in some circumstances, in an offshore factory. Internet technology enables anyone to distribute these copies to their friends, or the entire world. Indeed, virtually any popular recording is already likely available in the MP3 format, for free if you know where to look.

How the industry will respond to these challenges and protect the rights and livelihoods of copyright owners and managers and has been a matter of increasing discussion, both in private industry forums and the public media. Security disasters like the cracking of DVD-Video's CSS security system have increased doubt about the potential for effective robust security implementations. Meanwhile, the success of non-secure initiatives such as portable MP3 players lead many to believe that these decisions may have already been made.

Music consumers have grown accustomed to copying their music for their own personal use. This fact of life was written into law in the United States via the Audio Home Recording Act of 1992. Millions of consumers have CD players and purchase music in the Compact Disc format. It is expected to take years for a format transition away from Red Book CD Audio to reach significant market penetration.

Hence, a need exists for a new and improved system for protecting digital content against unauthorized copying and distribution.

SUMMARY OF THE INVENTION

A local content server system (LCS) for creating a secure environment for digital content is disclosed, which system comprises: a communications port in communication for connecting the LCS via a network to at least one Secure Electronic Content Distributor (SECD), which SECD is capable of storing a plurality of data sets, is capable of receiving a request to transfer at least one content data set, and is capable of transmitting the at least one content data set in a secured transmission; a rewritable storage medium whereby content received from outside the LCS may be stored and retrieved; a domain processor that imposes rules and procedures for content being transferred between the LCS and devices outside the LCS; and a programmable address module which can be programmed with an identification code uniquely associated with the LCS. The LCS is provided with rules and procedures for accepting and transmitting content data. Optionally, the system may further comprise: an interface to permit the LCS to communicate with one or more Satellite Units (SU) which may be connected to the system through the interface, which SUs are capable of receiving and transmitting digital content; at least one SU; and/or at least one SECD. The SECD may have a storage device for storing a plurality of data sets, as well as a transaction processor for validating the request to purchase and for processing payment for a request to retrieve one of the data sets. The SECD typically includes a security module for encrypting or otherwise securitizing data which the SECD may transmit.

A method for creating a secure environment for digital content for a consumer is also disclosed. As part of the method, a LCS requests and receives a digital data set that may be encrypted or scrambled. The digital data set may be embedded with at least one robust open watermark, which permits the content to be authenticated. The digital data set is preferably be embedded with additional watermarks which are generated using information about the LCS requesting the copy and/or the SECD which provides the copy. Once received by the LCS, the LCS exercises control over the content and only releases the data to authorized users. Generally, the data is not released until the LCS embeds at least one additional watermark based upon protected information associated with the LCS and/or information associated with the user.

Another embodiment of the method of the present invention comprises: connecting a Satellite Unit to an local content server (LCS), sending a message indicating that the SU is requesting a copy of a content data set that is stored on the LCS, said message including information about the identity of the SU; analyzing the message to confirm that the SU is authorized to use the LCS; retrieving a copy of the requested content data set; assessing whether a secured connection exists between the LCS and the SU; if a secured connection exists, embedding a watermark into the copy of the requested content data set, said watermark being created based upon information transmitted by the SU and information about the LCS; and delivering the content data set to the SU for its use.

The SU may also request information that is located not on the LCS, but on an SECD, in which case, the LCS will request and obtain a copy from the SECD, provided the requesting SU is authorized to access the information.

Digital technology offers economies of scale to value-added data not possible with physical or tangible media distribution. The ability to digitize information both reduces the cost of copying and enables perfect copies. This is an advantage and a disadvantage to commercial publishers who must weigh the cost reduction against the real threat of unauthorized duplication of their value-added data content. Because cost reduction is an important business consideration, securing payment and authenticating individual copies of digital information (such as media content) presents unique opportunities to information service and media content providers. The present invention seeks to leverage the benefits of digital distribution to consumers and publishers alike, while ensuring the development and persistence of trust between all parties, as well as with any third parties involved, directly or indirectly, in a given transaction.

In another approach that is related to this goal, there are instances where transactions must be allowed to happen after perceptually-based digital information can be authenticated. (Perceptually based information is information whose value is in large part, based upon its ability to be perceived by a human, and includes for example, acoustic, psychoacoustic, visual and psychovisual information.) The process of authenticating before distributing will become increasingly important for areas where the distributed material is related to a trust-requiring transaction event. A number of examples exist. These include virtual retailers (for example, an on-line music store selling CDs and electronic versions of songs); service providers (for example, an on-line bank or broker who performs transactions on behalf of a consumer); and transaction providers (for example, wholesalers or auction houses).

These parties have different authentication interests and requirements. By using the teachings of this application, these interests and requirements may be separated and then independently quantified by market participants in shorter periods of time.

All parties in a transaction must authenticate information that is perceptually observable before trust between the parties can be established. In today's world, information (including perceptually rich information) is typically digitized, and as a result, can easily be copied and redistributed, negatively impacting buyers, sellers and other market participants. Unauthorized redistribution confuses authenticity, non-repudiation, limit of ability and other important "transaction events." In a networked environment, transactions and interactions occur over a transmission line or a network, with buyer and seller at different points on the line or network. While such electronic transactions have the potential to add value to the underlying information being bought and sold (and the potential to reduce the cost of the transaction), instantaneous piracy can significantly reduce the value of the underlying data, if not wholly destroy it. Even the threat of piracy tends to undermine the value of the data that might otherwise exist for such an electronic transaction.

Related situations range from the ability to provably establish the "existence" of a virtual financial institution to determining the reliability of an "electronic stamp." The present invention seeks to improve on the prior art by describing optimal combinations of cryptographic and steganographic protocols for "trusted" verification, confidence and non-repudiation of digitized representations of perceptually rich information of the actual seller, vendor or other associated institutions which may not be commercial in nature (confidence building with logo's such as the SEC, FDIC, Federal Reserve, FBI, etc. apply). To the extent that an entity plays a role in purchase decisions made by a consumer of goods and services relating to data, the present invention has a wide range of beneficial applications. One is enabling independent trust based on real world representations that are not physically available to a consumer or user. A second is the ability to match informational needs between buyers and sellers that may not be universally appealing or cost effective in given market situations. These include auction models based on recognition of the interests or demand of consumers and market participants which make trading profitable by focusing specialized buyers and sellers. Another use for the information matching is to establish limits on the liability of such institutions and profit-seeking entities, such as insurance providers or credit companies. These vendors lack appropriate tools for determining intangible asset risk or even the value of the information being exchanged. By encouraging separate and distinct "trust" arrangements over an electronic network, profitable market-based relationships can result.

The present invention can make possible efficient and openly accessible markets for tradable information. Existing transaction security (including on-line credit cards, electronic cash or its equivalents, electronic wallets, electronic tokens, etc.) which primarily use cryptographic techniques to secure a transmission channel—but are not directly associated or dependent on the information being sold—fails to meet this valuable need. The present invention proposes a departure from the prior art by separating transactions from authentication in the sale of digitized data. Such data may include videos, songs, images, electronic stamps, electronic trademarks, and electronic logos used to ensure membership in some institutional body whose purpose is to assist in a dispute, limit liability and provide indirect guidance to consumers and market participants, alike.

With an increasingly anonymous marketplace, the present invention offers invaluable embodiments to accomplish "trusted" transactions in a more flexible, transparent manner while enabling market participants to negotiate terms and conditions. Negotiation may be driven by predetermined usage rules or parameters, especially as the information economy offers potentially many competitive marketplaces in which to transact, trade or exchange among businesses and consumers. As information grows exponentially, flexibility becomes an advantage to market participants, in that they need to screen, filter and verify information before making a transaction decision. Moreover, the accuracy and speed at which decisions can be made reliably enables confidence to grow with an aggregate of "trusted transactions". "Trusted transactions" beget further "trusted transactions" through experience. The present invention also provides for improvements over the prior art in the ability to utilize different independently important "modules" to enable a "trusted transaction" using competitive cryptographic and steganographic elements, as well as being able to support a wide variety of perceptually-based media and information formats. The envisioned system is not bound by a proprietary means of creating recognition for a good or service, such as that embodied in existing closed system. Instead, the flexibility of the present invention will enable a greater and more diverse information marketplace.

The present invention is not a "trusted system", per se, but "trusted transactions" are enabled, since the same value-added information that is sought may still be in the clear, not in a protected storage area or closed, rule-based "inaccessible virtual environment".

A related additional set of embodiments regards the further separation of the transaction and the consumer's identification versus the identification of the transaction only. This is accomplished through separated "trusted transactions" bound by authentication, verification and authorization in a transparent manner. With these embodiments, consumer and vendor privacy could be incorporated. More sophisticated relationships are anticipated between parties, who can mix information about their physical goods and services with a transparent means for consumers, who may not be known to the seller, who choose not to confide in an inherently closed "trusted system" or provide additional personal information or purchasing information (in the form of a credit card or other electronic payment system), in advance of an actual purchase decision or ability to observe (audibly or visibly) the content in the clear. This dynamic is inconsistent with the prior art's emphasis on access control, not transparent access to value-added information (in the form or goods or services), that can be transacted on an electronic or otherwise anonymous exchange.

These embodiments may include decisions about availability of a particular good or service through electronic means, such as the Internet, or means that can be modularized to conduct a transaction based on interconnection of various users (such as WebTV, a Nintendo or Sony game console with network abilities, cellular phone, PalmPilot, etc.). These embodiments may additionally be implemented in traditional auction types (including Dutch auctions). Consumers may view their anonymous marketplace transactions very differently because of a lack of physical human interactions, but the present invention can enable realistic transactions to occur by maintaining open access and offering strict authentication and verification of the information being traded. This has the effect of allowing legacy relationships, legacy information, and legacy business models to be offered in a manner which more closely reflects many observable transactions in the physical world. The tremendous benefits to sellers and consumers is obvious; existing transactions need not reduce their expectations of security. As well, the ability to isolate and quantify aspects of a transaction by module potentially allows for better price determinations of intangible asset insurance, transaction costs, advertising costs, liability, etc. which have physical world precedent.

It is contemplated that the publisher and/or owner of the copyrights will want to dictate restrictions on the ability of the purchaser to use the data being sold. Such restrictions can be implemented through the present invention, which presents a significant advantage over the prior art (which attempts to effect security through access control and attempted tight reigns over distribution). See U.S. Pat. No. 5,428,606 for a discussion on democratizing digital information exchange between publishers and subscribers of said information.

A goal for providers of value-added content is to maximize profits for the sale of their content. Marketing and promotion of the informational content cannot be eliminated, considering the ever-increasing amount of information vying for consumers and other market participant's attention. Nonetheless, in a market where the goods are speculatively valued, marketing budgets are inherently constrained, as you are trying to create demand for a product with little inherent value. Where such markets have participants, both buyers and sellers and their respective agents, with access to the same information in real time, market mechanisms efficiently price the market goods or services. These markets are characterized by "price commoditization" so buyers and sellers are limited to differentiating their offerings by selection and service. If the markets are about information itself, it has proven more difficult to accurately forecast the target price where sellers can maximize their profits. Quality and quantity provide different evaluation criteria of selection and service relating to the information being traded. The present invention regards a particular set of implementations of value-added content security in markets which may include unsecured and secure versions of the same value-added data (such as songs, video, research, pictures, electronic logos, electronic trademarks, value-added information, etc.).

Transactions for value-added information can occur without any physical location. So, there is a need for a secure personal content server for which the value added information can be offered for transactions in a manner similar to real world transactions. One feature is to offer seemingly similar value added information in differing quality settings. These settings have logical relationships with fidelity and discreteness and are determined by market participants. Another issue is that because purchasers may be anonymous to sellers, it is more important to have a particular value-added information object available so that market participants can fulfill their role are consumers.

One fundamental weakness of current information markets is the lack of mechanisms to ensure that buyers and sellers can reach pricing equilibrium. This deficit is related to the "speculative", "fashion", and "vanity" aspects of perceptual content (such as music, video, and art or some future recognition to purchasers). For other goods and services being marketed to an anonymous marketplace, market participants may never see (and indeed, may choose to never see, an actual location where the transaction may physically occur. A physical location may simply not exist. There are a number of such virtual operations in business today, which would benefit from the improvements offered under the present system.

The present invention also seeks to provide improvements to the art in enabling a realistic model for building trust between parties (or their agents) not in a "system", per se.

Because prior art systems lack any inherent ability to allow for information to flow freely to enable buyers and sellers to react to changing market conditions. The present invention can co-exist with these "trusted systems" to the extent that all market participants in a given industry have relatively similar information with which to price value-added data. The improvement over such systems, however, addresses a core features in most data-added value markets: predictions, forecasts, and speculation over the value of information is largely an unsuccessful activity for buyers and sellers alike. The additional improvement is the ability to maintain security even with unsecured or legacy versions of value-added information available to those who seek choices that fit less quantitative criteria—"aesthetic quality" of the information versus "commercial price". Purchase or transaction decisions can be made first by authenticating an electronic version of a song, image, video, trademark, stamp, currency, etc.

Additional anticipated improvements include the ability to support varying pricing models such as auctions that are difficult or impossible to accomplish under existing prior art that leaves all access and pricing control with the seller alone, and the separation of the transaction from the exchange of the value-added information, which gives more control to buyers over their identities and purchasing habits, (both sensitive and separately distinct forms of "unrelated" value-added information). Essentially, no system known in the art allows for realistic protocols to establish trust between buyers and sellers in a manner more closely reflecting actual purchasing behavior of consumers and changing selling behavior of sellers. The goal in such transactions is the creation of trust between parties as well as "trusted relationships" with those parties. The present invention is an example of one such system for media content where the "aesthetic" or "gestalt" of the underlying content and its characteristics is a component of buying habits. Without an ability to open distribution systems to varying buyers and sellers, media content may be priced at less than maximum economic value and buyers may be deprived of a competitive, vigorous marketplace for exciting media content from many different creative participants.

To the extent that recognition plays such a key role in an information economy, value-added data should be as accessible as possible to the highest number of market participants in the interests of furthering creativity and building a competitive marketplace for related goods and services. This is to the benefit of both buyers and sellers as well as the other participants in such an economic ecosystem. The Internet and other transmission-based transactions with unknown parties presents a number of challenges to information vendors who wish to develop customer relations, trust and profitable sales. The information economy is largely an anonymous marketplace, thus, making it much more difficult to identify consumers and sellers. The present invention provides remedies to help overcome these weaknesses.

The present invention is concerned with methods and systems which enable secure, paid exchange of value-added information, while separating transaction protocols. The present invention improves on existing means for distribution control by relying on authentication, verification and authorization that may be flexibly determined by both buyers and sellers. These determinations may not need to be predetermined, although pricing matrix and variable access to the information opens additional advantages over the prior art. The present invention offers methods and protocols for ensuring value-added information distribution can be used to facilitate trust in a large or relatively anonymous marketplace (such as the Internet's World Wide Web).

We now define components of the preferred embodiments for methods, systems, and devices.

Definitions

Local Content Server (LCS): A device or software application which can securely store a collection of value-added digital content. The LCS has a unique ID.

Secure Electronic Content Distributor (SECD): An entity, device or software application which can validate a transaction with a LCS, process a payment, and deliver digital content securely to a LCS. In cryptographic terms, the SECD acts as a "certification authority" or its equivalent. SECDs may have differing arrangements with consumers and providers of value-added information. (The term "content" is used to refer generally to digital data, and may comprise video, audio, or any other data that is stored in a digital format).

Satellite Unit (SU): A portable medium or device which can accept secure digital content from a LCS through a physical, local connection and which can either play or make playable the digital content. The SU may have other functionality as it relates to manipulating the content, such as recording. The SU has a unique ID. An SU may be a CD player, a video camera, a backup drive, or other electronic device which has a storage unit for digital data.

LCS Domain: A secure medium or area where digital content can be stored, with an accompanying rule system for transfer of digital content in and out of the LCS Domain. The domain may be a single device or multiple devices—all of which have some common ownership or control. Preferably, a LCS domain is linked to a single purchasing account. Inside the domain, one can enjoy music or other digital data without substantial limitations—as typically a license extends to all personal use.

SecureChannel™: A secure channel to pass individualized content to differentiate authentic content from legacy or unauthorized, pirated content. For example, the Secure Channel may be used as an auxiliary channel through which members of the production and distribution chain may communicate directly with individual consumers. Preferably, the Secure Channel is never exposed and can only be accessed through legitimate methods. SecureChannel may carry a value-adding component (VAC). The ability to provide consumers with value adding features will serve to give consumers an incentive to purchase new, secure hardware and software that can provide the additional enhanced services. The SecureChannel may also include protected associated data ("PAD")—data which is associated with a user and/or a particular set of content.

Standard Quality: A transfer path into the LCS Domain which maintains the digital content at a predetermined reference level or degrades the content if it is at a higher quality level. In an audio implementation, this might be defined as Red Book CD Quality (44100 Hz., 16 bits, 2 channels). This transfer path can alternately be defined in terms of a subset of VAC's or a quality level associated with particular VAC's. If a VAC is not in the subset, it is not passed. If a VAC is above the defined quality level, it is degraded.

Low Quality: A transfer path into the LCS Domain which degrades the digital content to a sub-reference level. In an audio implementation, this might be defined as below CD Quality (for instance, 32000 Hz., 16 bits, 2 channels). This transfer path can alternately be defined in terms of an absence of VAC's or a degraded quality level associated with particular VAC's.

High Quality: A transfer path into the LCS Domain which allows digital content of any quality level to pass unaltered. This transfer path can alternately be defined in terms of a complete set of VAC's or the highest quality level available associated with particular VAC's.

Rewritable Media: An mass storage device which can be rewritten (e.g. hard drive, CD-RW, Zip cartridge, M-O drive, etc. . . . ).

Read-Only Media: A mass storage device which can only be written once (e.g. CD-ROM, CD-R, DVD, DVD-R, etc. . . . ). Note: pre-recorded music, video, software, or images, etc. are all "read only" media.

Unique ID: A Unique ID is created for a particular transaction and is unique to that transaction (roughly analogous to a human fingerprint). One way to generate a Unique ID is with a one-way hash function. Another way is by incorporating the hash result with a message into a signing algorithm will create a signature scheme. For example, the hash result may be concatenated to the digitized, value added information which is the subject of a transaction. Additional uniqueness may be observed in a hardware device so as to differentiate that device, which may be used in a plurality of transactions, from other similar devices.

Value-added: Value-added information is differentiated from non-commoditized information in terms of its marketability or demand, which can vary, obviously, from each market that is created for the information. By way of example, information in the abstract has no value until a market is created for the information (i.e., the information becomes a commodity). The same information can be packaged in many different forms, each of which may have different values. Because information is easily digitized, one way to package the "same" information differently is by different levels of fidelity and discreteness. Value is typically bounded by context and consideration.

Authentication: A receiver of a "message" (embedded or otherwise within the value-added information) should be able to ascertain the original of the message (or by effects, the origin of the carrier within which the message is stored). An intruder should not be able to successfully represent someone else. Additional functionality such as Message Authentication Codes (MAC) could be incorporated (a one-way hash function with a secret key) to ensure limited verification or subsequent processing of value-added data.

Verification: In cryptographic terms, "verification" serves the "integrity" function to prevent an intruder from substituting false messages for legitimate ones. In this sense, the receiver of the message (embedded or otherwise present within the value-added information) should be assured that the message was not modified or altered in transit.

One-way hash function: One-way hash functions are known in the art. A hash function is a function which converts an input into an output, which is usually a fixed-sized output. For example, a simple hash function may be a function which accepts a digital stream of bytes and returns a byte consisting of the XOR function of all of the bytes in the digital stream of input data. Roughly speaking, the hash function may be used to generate a "fingerprint" for the input data. The hash function need not be chosen based on the characteristics of the input. Moreover, the output produced by the hash function (i.e., the "hash") need not be secret, because in most instances it is not computationally feasible to reconstruct the input which yielded the hash. This is especially true for a "one-way" hash function—one that can be used to generate a hash value for a given input string, but which hash cannot be used (at least, not without great effort) to create an input string that could generate the same hash value.

Authorization: A term which is used broadly to cover the acts of conveying official sanction, permitting access or granting legal power to an entity.

Encryption: For non digitally-sampled data, encryption is data scrambling using keys. For value-added or information rich data with content characteristics, encryption is typically slow or inefficient because content file sizes tend to be generally large. Encrypted data is called "ciphertext".

Scrambling: For digitally-sampled data, scrambling refers to manipulations of the value-added or information rich data at the inherent granularity of the file format. The manipulations are associated with a key, which may be made cryptographically secure or broken into key pairs. Scrambling is efficient for larger media files and can be used to provide content in less than commercially viable or referenced quality levels. Scrambling is not as secure as encryption for these applications, but provides more fitting manipulation of media rich content in the context of secured distribution. Scrambled data is also called "ciphertext" for the purposes of this invention. Encryption generally acts on the data as a whole, whereas scrambling is applied often to a particular subset of the data concerned with the granularity of the data, for instance the file formatting. The result is that a smaller amount of data is "encoded" or "processed" versus strict encryption, where all of the data is "encoded" or "processed." By way of example, a cable TV signal can be scrambled by altering the signal which provides for horizontal and vertical tracking, which would alter only a subset of the data, but not all of the data—which is why the audio signal is often untouched. Encryption, however, would generally so alter the data that no recognizable signal would be perceptually appreciated. Further, the scrambled data can be compared with the unscrambled data to yield the scrambling key. The difference with encryption is that the ciphertext is not completely random, that is, the scrambled data is still perceptible albeit in a lessened quality. Unlike watermarking, which maps a change to the data set, scrambling is a transfer function which does not alter or modify the data set.

DETAILED DISCUSSION OF INVENTION

The LCS Domain is a logical area inside which a set of rules governing content use can be strictly enforced. The exact rules can vary between implementations, but in general, unrestricted access to the content inside the LCS Domain is disallowed. The LCS Domain has a set of paths which allow content to enter the domain under different circumstances. The LCS Domain also has paths which allow the content to exit the domain.

A simple example provides insight into the scope of an LCS domain. If an LCS is assigned to an individual, then all music, video, and other content data which has lawfully issued to the individual may be freely used on that persons LCS domain (though perhaps "freely" is misleading, as in theory, the individual has purchased a license). A LCS Domain may comprise multiple SUs, for example, a video player, a CD player, etc. An individual may be authorized to take a copy of a song and play it in another's car stereo, but only while the individual's device or media is present. Once the device is removed, the friend's LCS will no longer have a copy of the music to play.

The act of entering the LCS Domain includes a verification of the content (an authentication check). Depending upon the source of the content, such verification may be easier or harder. Unvalidateable content will be subjected to a quality degradation. Content that can be validated but which belongs to a different LCS Domain will be excluded. The primary purpose of the validation is to prevent unauthorized, high-quality, sharing of content between domains.

When content leaves the LCS Domain, the exiting content is embedded with information to uniquely identify the exiting content as belonging to the domain from which the content is leaving. It is allowed to leave at the quality level at which the content was originally stored in the LCS Domain (i.e. the quality level determined by the validation path). For example, the exiting content may include an embedded digital watermark and an attached hash or digital signature; the exiting content may also include a time stamp—which itself may be embedded or merely attached). Once it has exited, the content cannot return to the domain unless both the watermark and hash can be verified as belonging to this domain. The presence of one or the other may be sufficient to allow re-entry, or security can be set to require the presence of more than one identification signal.

This system is designed to allow a certifiable level of security for high-quality content while allowing a device to also be usable with unsecured content at a degraded quality level. The security measures are designed such that a removal of the watermark constitutes only a partial failure of the system. The altered content (i.e., the content from which the watermark has been removed or the content in which the watermark has been degraded) will be allowed back into the LCS Domain, but only at a degraded quality level, a result of the watermark destruction and subsequent obscurity to the system, consumers will not be affected to the extent that the unauthorized content has only been degraded, but access has not been denied to the content. Only a complete forgery of a cryptographically-secure watermark will constitute a complete failure of the system. For a discussion on such implementations please see U.S. Pat. Nos. 5,613,004, 5,687,236, 5,745,569, 5,822,432, 5,889,868, 5,905,800, included by reference in their entirety and pending U.S. patent application Ser. No. 09/046,627 "Method for Combining Transfer Function . . . " (issued as U.S. Pat. No. 6,598,162), Ser. No. 09/053,628 "Multiple Transform Utilization and Application for Secure Digital Watermarking" (issued as U.S. Pat. No. 6,205,249), Ser. No. 08/775,216 "Steganographic Method and Device" (issued as U.S. Pat. No. 5,687,236), Ser. No. 08/772,222 "Z-Transform Implementation . . . " (issued as U.S. Pat. No. 6,078,664), Ser. No. 60/125,990 "Utilizing Data Reduction in Steganographic and Cryptographic Systems" which corresponds to U.S. patent application Ser. No. 09/594,719, filed Jun. 16, 2000, entitled "Utilizing Data Reduction in Steganographic and Cryptographic Systems" (issued as U.S. Pat. No. 7,123,718).

Provable security protocols can minimize this risk. Thus the embedding system used to place the watermark does not need to be optimized for robustness, only for imperceptibility (important to publishers and consumers alike) and security (more important to publishers than to consumers). Ideally, as previously disclosed, security should not obscure the content, or prevent market participants from accessing information, which in the long term, should help develop trust or create relationships.

The system can flexibly support one or more "robust" watermarks as a method for screening content to speed processing. Final validation, however, relies upon the fragile, secure watermark and its hash or digital signature (a secure time stamp may also be incorporated). Fragile watermarks, meaning that signal manipulations would affect the watermark, may be included as a means to affect the quality of the content or any additional attributes intended to be delivered to the consumer.

LCS Functions

The LCS provides storage for content, authentication of content, enforcement of export rules, and watermarking and hashing of exported content. Stored content may be on an accessible rewritable medium, but it must be stored as ciphertext (encrypted or scrambled), not plain text, to prevent system-level extraction of the content. This is in contrast to the prior art which affix or otherwise attach meta-data to the content for access control by the variously proposed systems.

Typically, an LCS receives secured data from one or more SECDs. The SECD transfers content only after it has been secured. For example, the SECD may use an individualized cryptographic container to protect music content while in transit. Such a container may use public/private key cryptography, ciphering and/or compression, if desired.

The LCS may be able to receive content from a SECD, and must be able to authenticate content received via any of the plurality of implemented paths. The LCS must monitor and enforce any rules that accompany received content, such as number of available copies. Finally, it is preferred for the LCS to watermark all exported material (with the exception of Path 6—see below) and supply a hash made from the unique ID of the LCS and the content characteristics (so as to be maintained perceptually within the information and increase the level of security of the watermark).

SU Functions

The SU enables the content to be usable away from the LCS. The SU is partially within the LCS Domain. A protocol must exist for the SU and LCS to authenticate any connection made between them. This connection can have various levels of confidence set by the level of security between the SU and LCS and determinable by a certification authority or its equivalent, an authorized site for the content, for example. The transfer of content from the SU to the LCS without watermarking is allowed. However, all content leaving the SU must be watermarked. Preferably, the SU watermark contains a hash generated from the SU's Unique ID and the content characteristics of the content being transferred. If the content came from a LCS, the SU watermark must also be generated based, in part, upon the hash received from the LCS. The LCS and SU watermarking procedures do not need to be the same. However, the LCS must be able to read the SU watermarks for all different types of SU's with which it can connect. The SU does not need to be able to read any LCS watermarks. Each LCS and SU must have separate Unique IDs.

Sample Embodiment

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 7 of the drawings, like numerals being used for like and corresponding parts of the various drawings.

Figure 1:
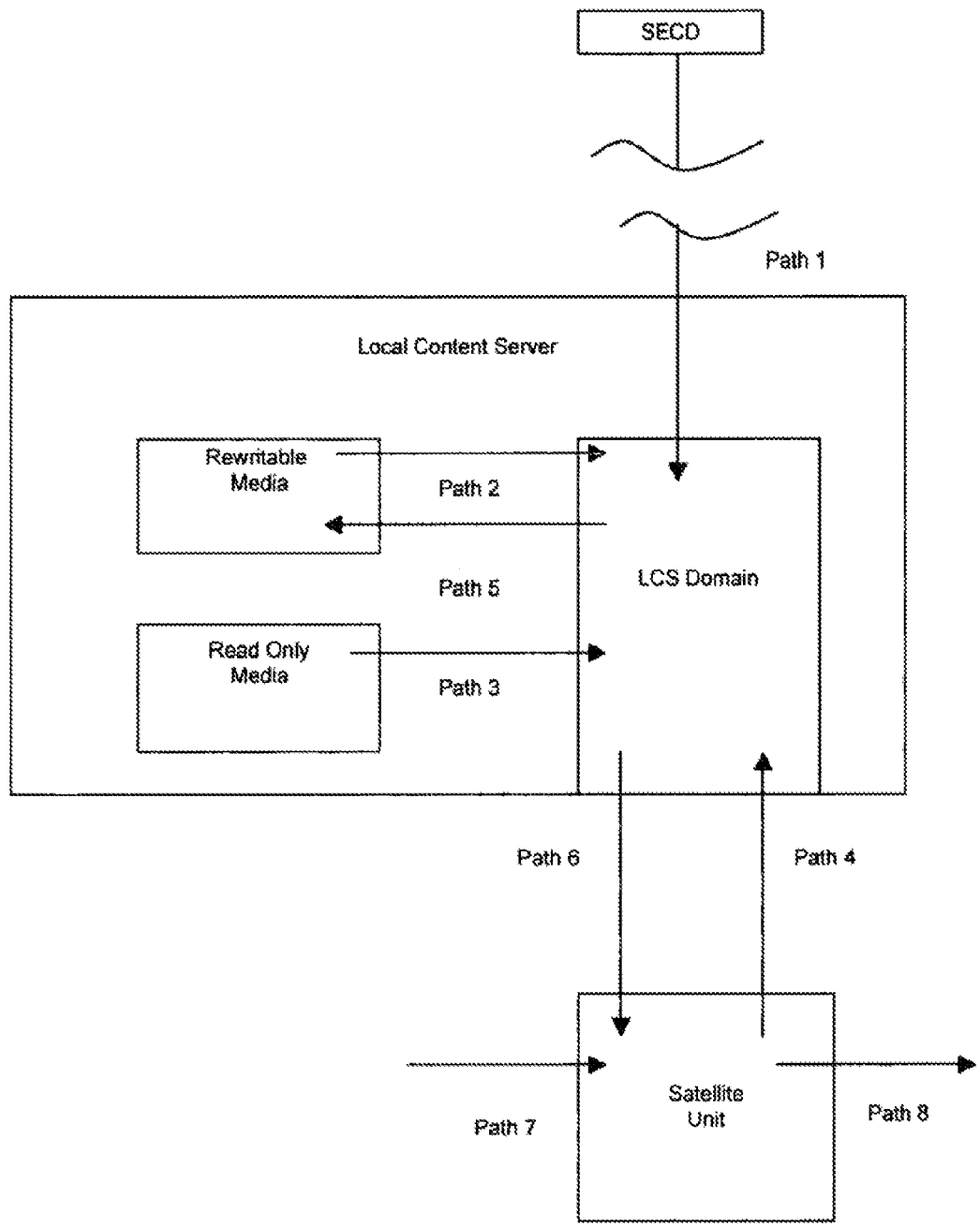
FIG. 1 shows in block diagram form a system for one embodiment of an LCS, showing the possible paths for content to enter and exit the system.

FIG. 1 is a block diagram showing the components of a sample LCS system and showing the possible paths for content to enter and leave the LCS. In the embodiment of FIG. 1, the LCS is a general purpose computing device such as a PC with software loaded to emulate the functions of a LCS. The LCS of FIG. 1 has a Rewritable media (such as a hard drive), a Read-Only media (such as a CD-ROM drive), and software to control access (which software, in effect, defines the "LCS Domain"). The Secure Electronic Content Distributor (SECD) is connected via a network (such as the Internet, intranet, cable, satellite link, cellular communications network, or other commonly accepted network). The Satellite Unite (SU) is a portable player which connects to the LCS and/or to other players where applicable (for example by way of a serial interface, USB, IEEE 1394, infrared, or other commonly used interface protocol). FIG. 1 also identifies seven (7) path ways.

Path 1 depicts a secure distribution of digital content from a SECD to a LCS. The content can be secured during the transmission using one or more 'security protocols' (e.g., encryption or scrambling). Moreover, a single LCS may have the capability to receive content transmissions from multiple SECDs, and each SECD may use the same security protocols or different security protocols. In the context of FIG. 1, however, only a single SECD is displayed. It is also contemplated that the same SECD may periodically or randomly use different security protocols. A typical security protocol uses an asymmetric cryptographic system, an example being a public key cryptography system where private and public key pairs allow the LCS to authenticate and accept the received content. Another security protocol may involve the ability to authenticate the received content using a signature scheme.

Figure 2:
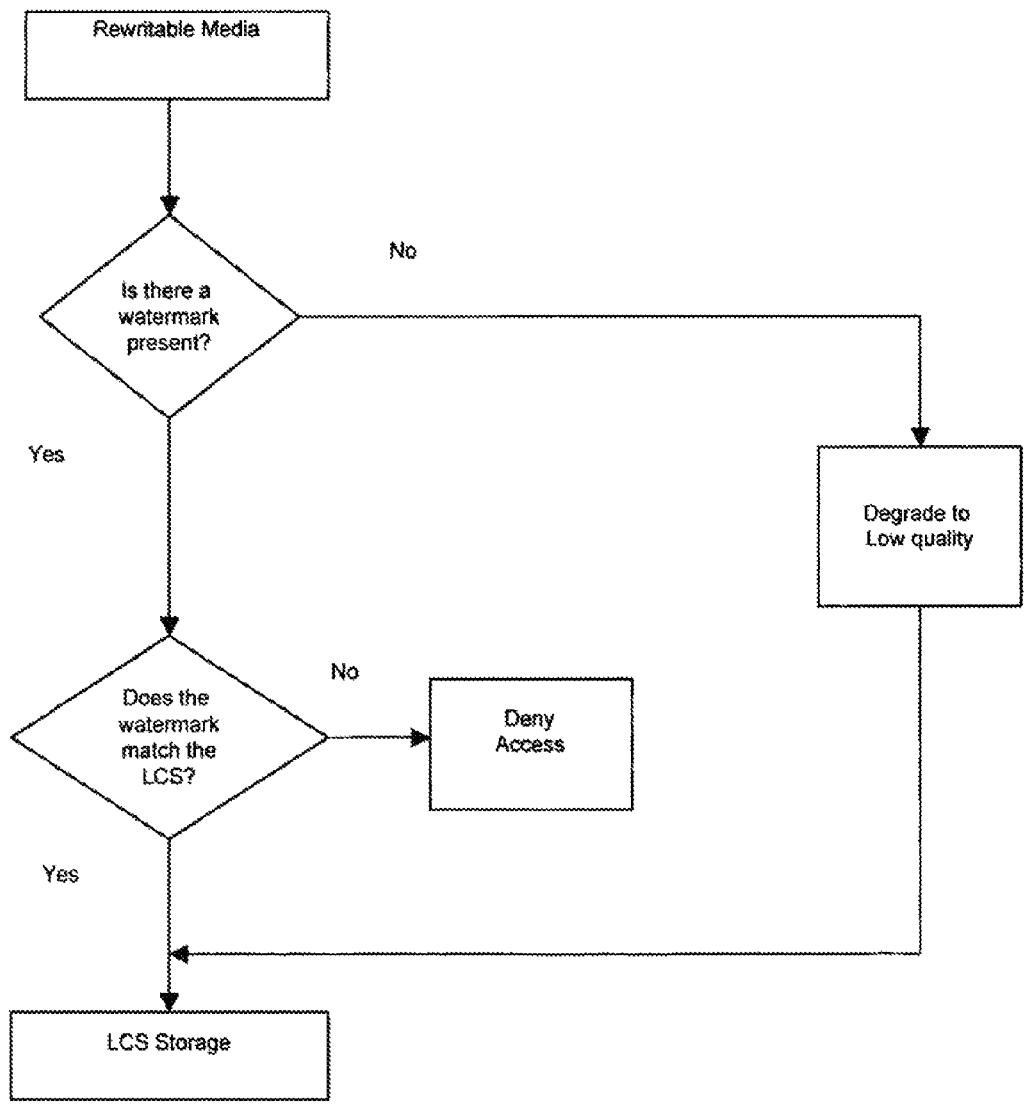
FIG. 2 is flow diagram illustrating the functions performed by the LCS of FIG. 1 when content enters the LCS Domain from the rewritable media.

In FIG. 2, content enters the LCS Domain from the rewritable media (such as a hard drive). This communication path is identified as Path 2 on FIG. 1. The LCS Domain analyzes the content to determine if a watermark is present in the content. If no watermark is present, then the quality of the content is downgraded to Low Quality before it is stored in the LCS Storage. If a watermark is present, then the watermark is extracted and compared with the watermark of the LCS in order to determine if a match exists. In the event of a match, the content is permitted to be stored on the LCS Storage at the same level of quality which the content entered the LCS Domain. Optionally, if a watermark is present, the hash may be checked as further verification; and if the hash matches, the content is allowed in at High Quality. If it does not match, the content is rejected. If the extracted watermark does not match the expected watermark, then the content is denied access to the LCS Storage (i.e., the content is rejected).

Figure 3:
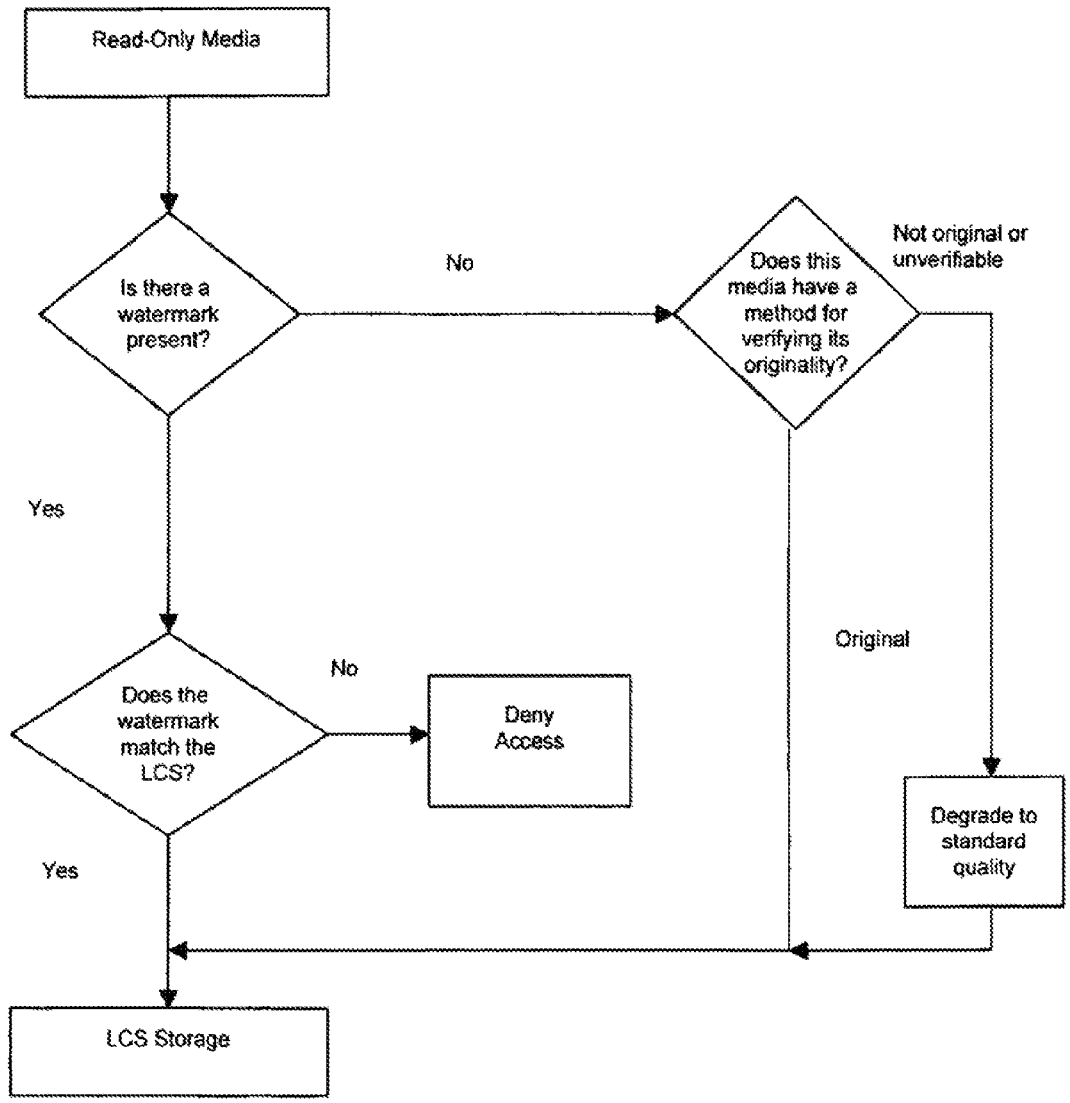
FIG. 3 is flow diagram illustrating the functions performed by the LCS of FIG. 1 when content enters the LCS Domain from the read-only media.

In FIG. 3, content enters the LCS Domain from the Read-Only media. This communication path is identified as Path 3 on FIG. 1. The LCS Domain analyzes the content to determine if a watermark is present in the content. If no watermark is present, then the LCS attempts to further analyze the content using other methods (i.e., other than watermarking) to try and verify the content for originality. If the content cannot be verified or is deemed to have been altered, then the content is downgraded to Standard Quality (or even Low Quality) before it is stored in the LCS Storage. If a watermark is present, then the watermark is extracted and compared with the watermark of the LCS in order to determine if a match exists. In the event of a match, or in the event that the content is verified by means other than the watermark, the content is permitted to be stored on the LCS Storage at the same level of quality which the content entered the LCS Domain (which is likely to be High Quality). For example, the Read-Only media may also contain a media-based identifier which verifies the content as an original, as opposed to a copy—and hence, a non-watermark method may be used to verify authenticity.

Optionally, even in the event of a watermark match, a hash may be checked as further verification; and if the hash matches, the content is allowed in at High Quality, but if there is no match, the content is rejected. If the extracted watermark does not match the expected watermark, or if the LCS is unable to identify any other method for verifying the content's authenticity, then the content may be denied access to the LCS Storage (i.e., the content may be rejected), or if preferred by the user, the content may be permitted into the system at a degraded quality level. It is the user's prerogative to decide how the system will treat non-authenticated content, as well as legacy content.

Figure 4:
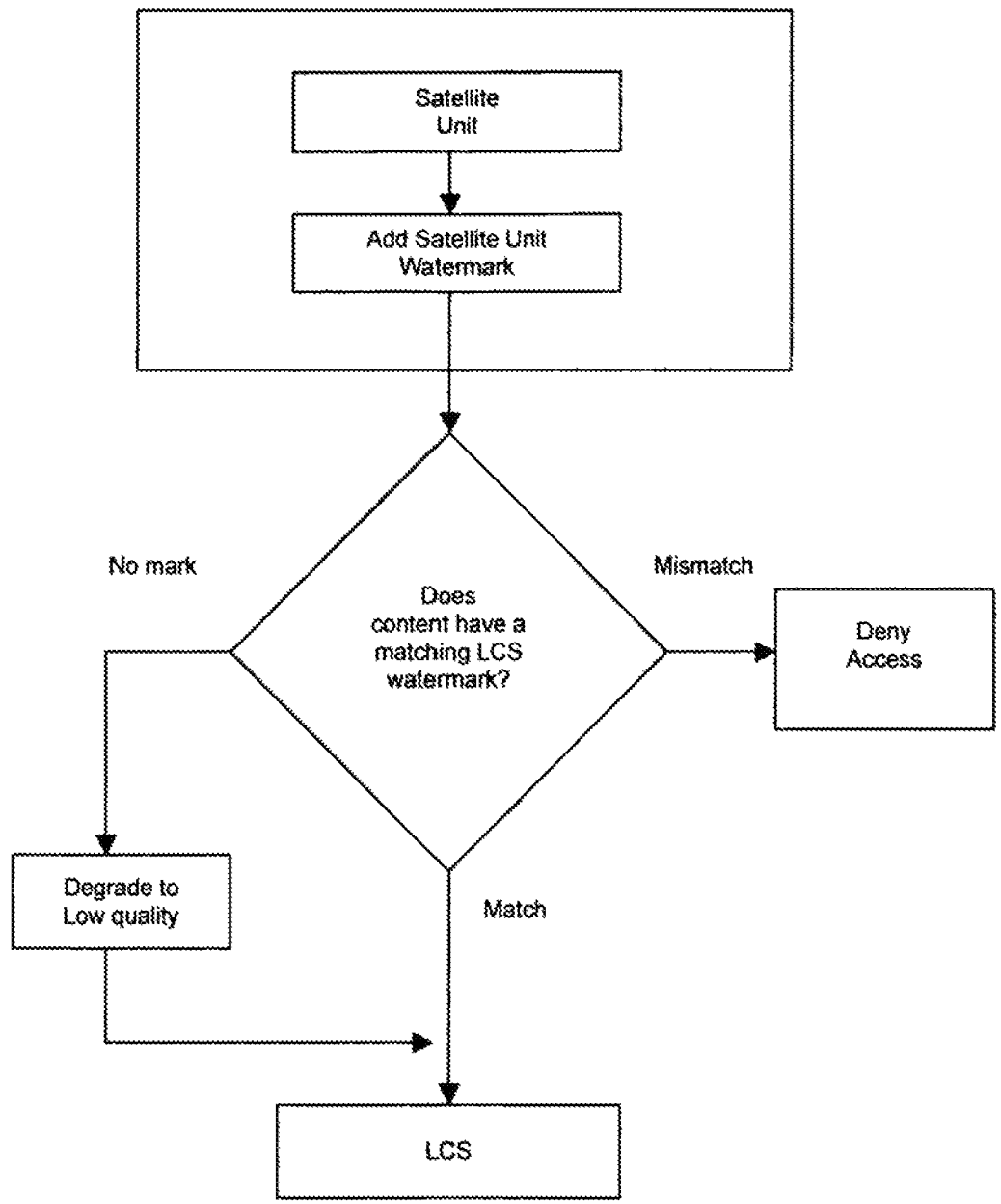
FIG. 4 is flow diagram illustrating the functions performed by the LCS of FIG. 1 when content enters the LCS Domain from the satellite unit.

In FIG. 4, content enters the LCS Domain from the satellite unit. This communication path is identified as Path 4 on FIG. 1. Content from an SU is marked with an SU watermark before exiting the SU. The LCS analyzes the content from the SU for watermarks, and in particular to determine if there is a watermark that matches that of the LCS. If the watermarks match, the content is permitted access to the LCS at the highest quality level. If there is a mismatch, then the content is denied access (i.e., the content is rejected). If the content does not contain a watermark, the quality is downgraded to Low Quality before permitting access to the LCS. Optionally, even in the event of a watermark match, a hash may be checked as further verification; and access at the highest quality level may depend upon both a match in watermarks and a match in hashes.

Figure 5:
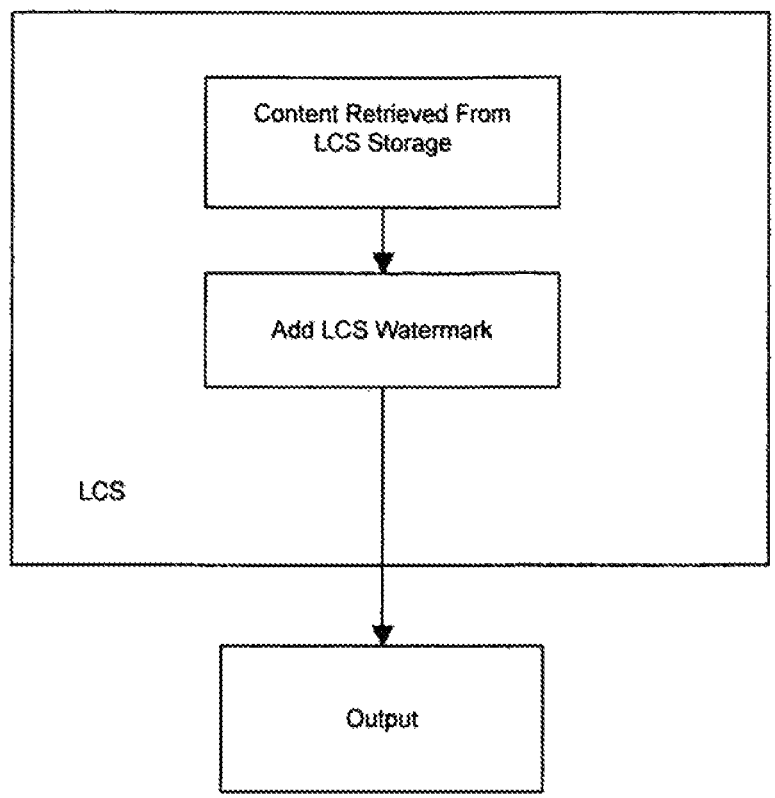
FIG. 5 is flow diagram illustrating the functions performed by the LCS of FIG. 1 when content leaves the LCS Domain.

In FIG. 5, content is shown leaving the LCS Domain. This communication path is identified as Path 5 on FIG. 1. Content is retrieved from the LCS storage and then the content may be watermarked with a watermark that is unique to the LCS (for example, one that is based upon the LCS's Unique ID). Optionally, a hash may be attached to the watermarked content, and/or the hash may be embedded as part of the watermark. If an external hash is used, preferably, for security purposes, the external hash should be created in a different manner from the embedded, watermark hash. Optionally, other information may be included in the watermark, for example, information to specify a time stamp, the number of allowable copies, etc. After watermarking, the content may be permitted to exit the LCS Domain, and may be exported to a device outside the LCS Domain, including for example, a rewritable media, a viewer, player, or other receiver.

Figure 6:
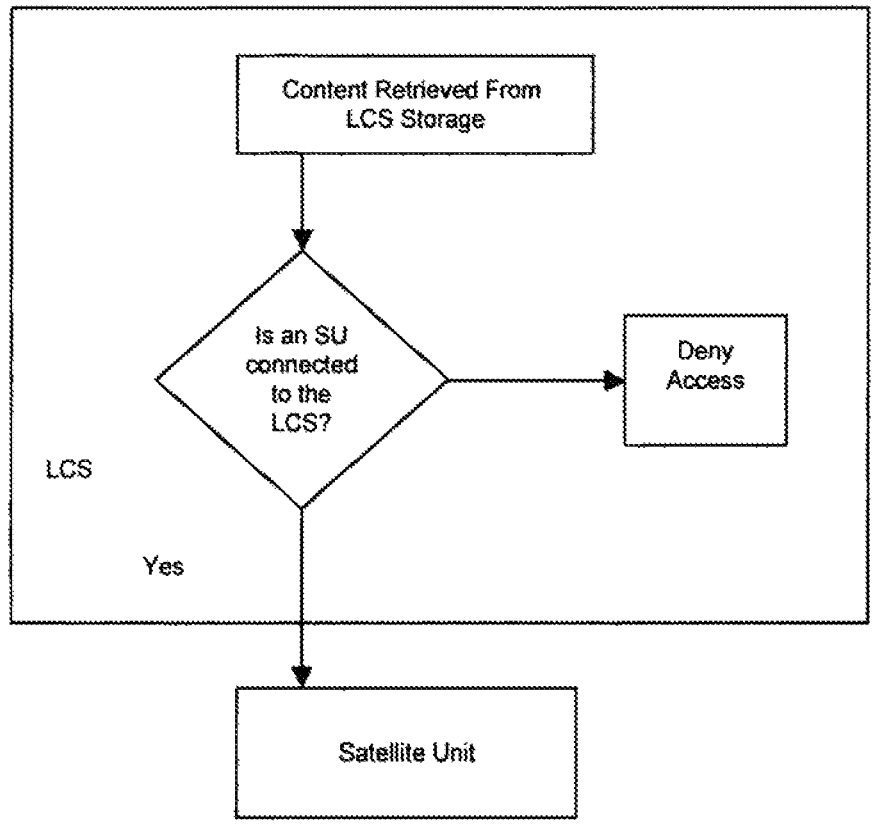
FIG. 6 is flow diagram illustrating the functions performed by the LCS of FIG. 1 when content leaves the LCS Domain from the read-only media.

In FIG. 6, content is shown leaving the LCS Domain. This communication path is identified as Path 6 on FIG. 1. This path is similar to Path 5, with a few important differences. The output receiver is an SU, and because the receiver is an SU, the content may leave the LCS without being watermarked. Path 6 requires a secure protocol to determine that the receiver is in fact an SU. Once the path is verified, the content can be exported without a watermark. The LCS may optionally transmit the content together with a hash value which will be uniquely associated with the content.

Figure 7:
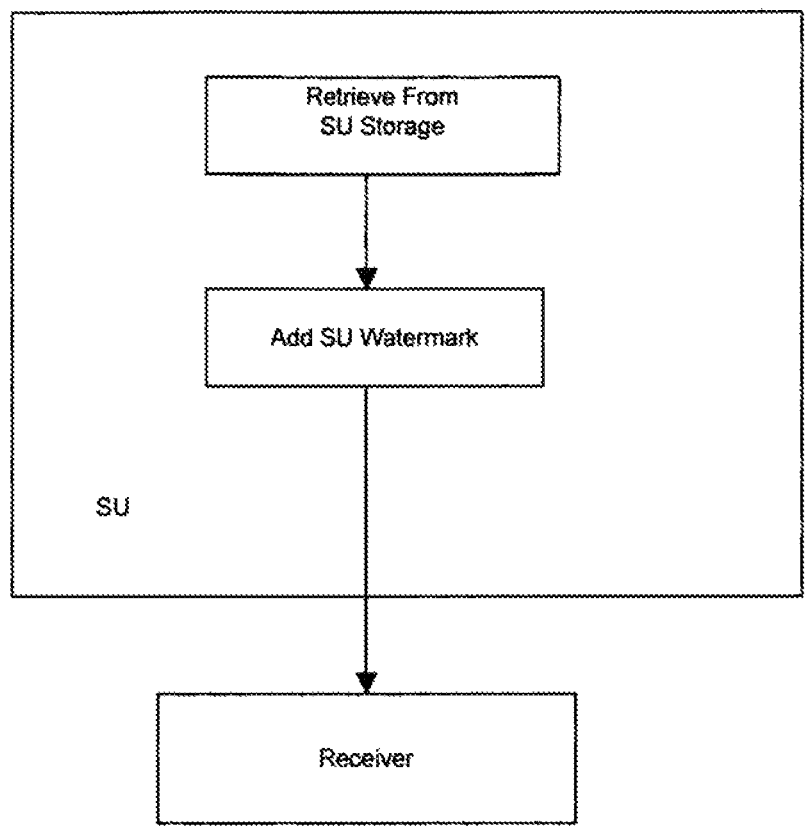
FIG. 7 is flow diagram illustrating the functions performed by the LCS of FIG. 1 when content leaves the SU to a receiver other than the LCS.
Figure 8:
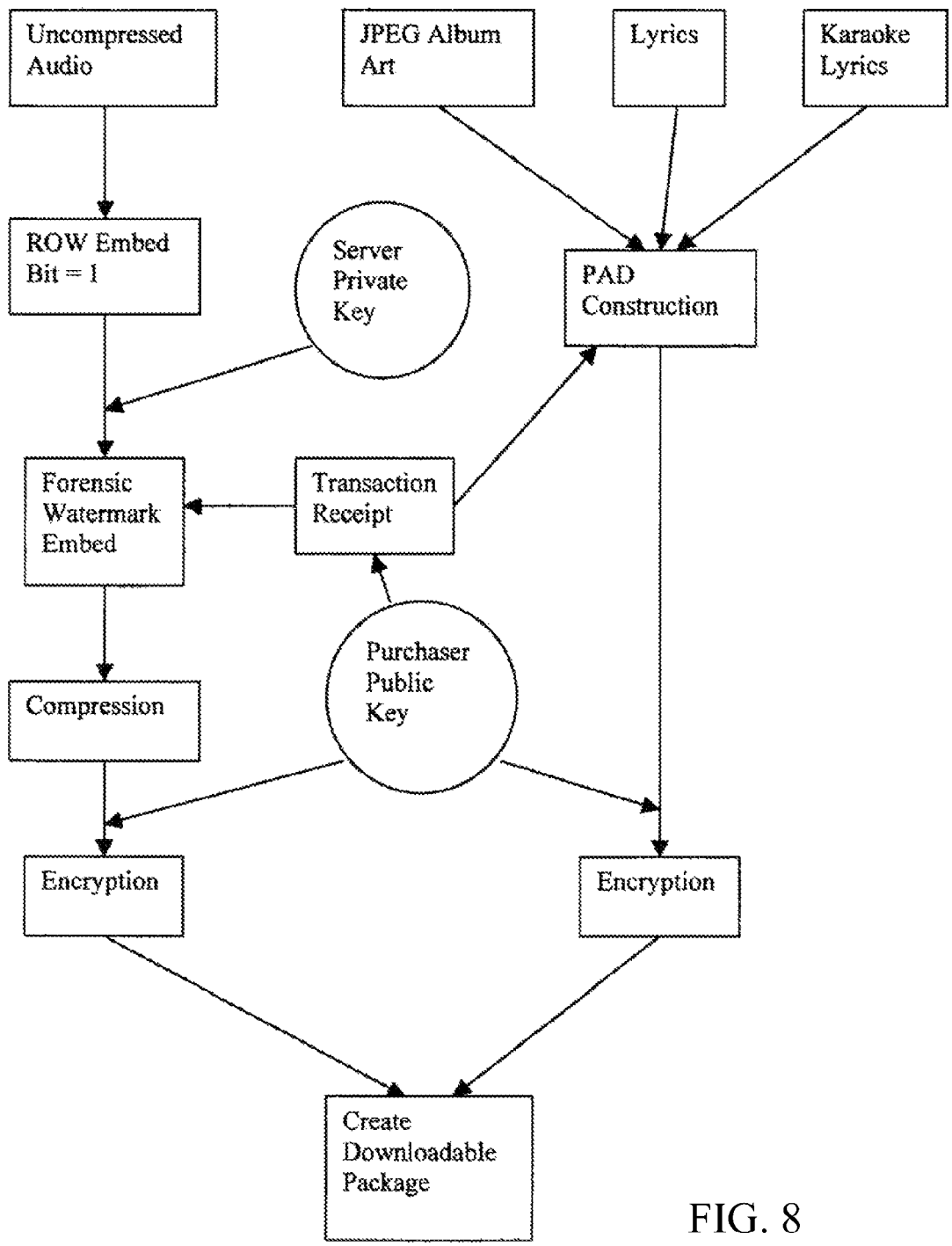
FIG. 8 is a sample embodiment for an SPCS Audio Server, and in particular shows how secured content packages are created as downloadable units. "PAD" refers to "Protected Associated Data".
Figure 9:
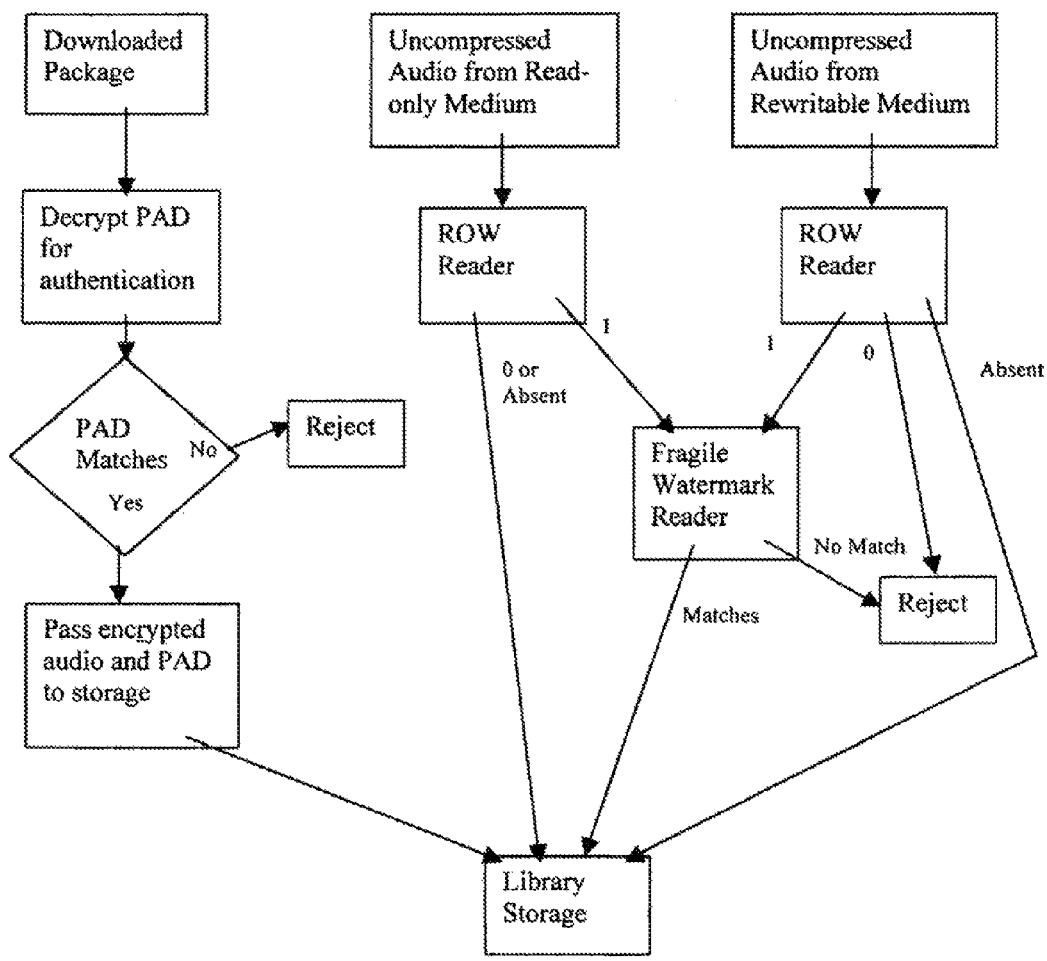
FIG. 9 is a sample embodiment for an SPCS Audio Server, and in particular shows how the LCS works on the input side for an SPCS Audio Server. "PAD" refers to "Protected Associated Data".
Figure 10:
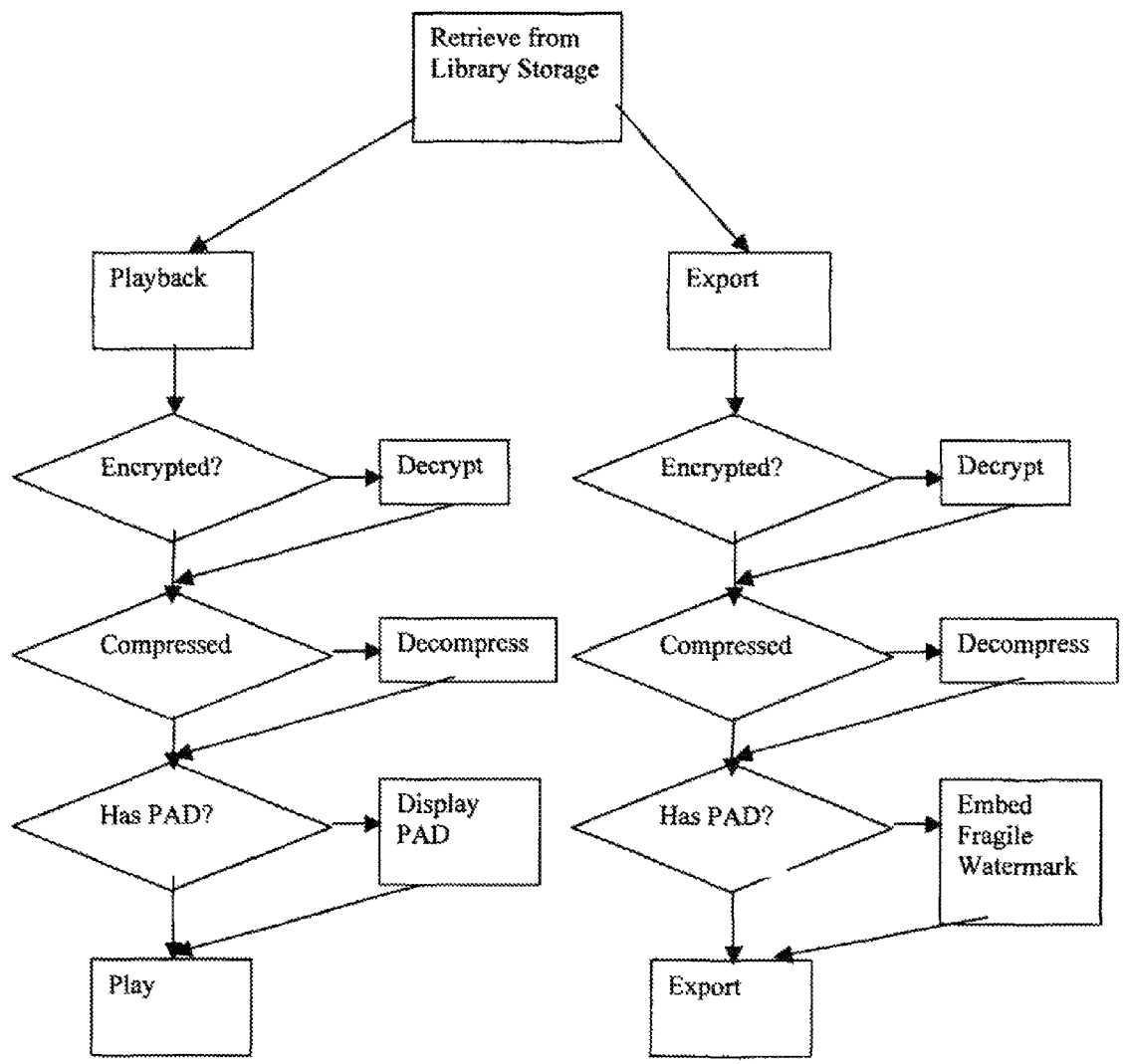
FIG. 10 is a sample embodiment for an SPCS Audio Server, and in particular shows how the LCS works on the output side. "PAD" refers to "Protected Associated Data".

In FIG. 7, content is shown leaving the SU, to a receiver other than the LCS. This communication path is identified as Path 7 on FIG. 1. Content is retrieved from the SU storage and then the content may be watermarked with a watermark that is unique to the SU (for example, one that is based upon the SU's Unique ID). Optionally, a hash may be attached to the watermarked content, and/or the hash may be embedded as part of the watermark. If an external hash is used, preferably, for security purposes, the external hash should be created in a different manner from the embedded, watermark hash. Optionally, other information may be included in the watermark, for example, information to specify a time stamp, the number of allowable copies, etc., and may even include the hash which the LCS attached to the content After watermarking, the content may be permitted to exit the SU, and may be exported to a device other than the LCS, including for example, a rewritable media, a viewer, player, or other receiver. The quality level of the content leaving the LCS is generally the same quality level as that of the content when stored internally to the LCS.

The system of the present invention is utilized to complete digital data transactions. A typical transaction would have the following steps:

1.) Using an LCS, a user connects to a SECD.

2.) The user reviews a collection of data sets which are available for license (which for purposes of this application, may be equated with a purchase). The user then selects a data set (e.g., a song or other content), and purchases (or otherwise obtains the right to receive) a copy of the data set. (The user may transmit purchase information, for example, credit card information, using digital security that is known in the art of electronic commerce.)

3.) The SECD transmits the secured content to the LCS. Before transmitting any digital content, the SECD embeds at least one watermark and may also transmit (perhaps through cryptography) at least one hash value along with the data being transmitted. The at least one hash value may be embedded with the at least one watermark or may be attached to the beginning or end of the data being transmitted. Alternately, the hash output may be combined in ways that are known in the art.

4.) The LCS optionally may send its public key to the SECD, in which case the SECD may use the LCS public key to apply an additional security measure to the data to be transmitted, before the data is actually transmitted to the LCS.

5.) The LCS receives the secured content transmitted by the SECD. The LCS may optionally use its private key to remove the additional layer of security which was applied with the LCS's public key.

6.) The LCS may authenticate the secure content that was received from the SECD by checking the watermark(s) and/or hash values. Optionally, the LCS may unpack the secured content from its security wrapper and/or remove any other layers of security. If the content can be authenticated, the content may be accepted into the LCS domain. Otherwise, it may be rejected.

Fragile Watermark Structure

A fragile watermark—one that is encoded in the LSB of each 16 bit sample—can actually hold all of the data that would typically comprise the information being transmitted in the SecureChannel™. At a typical sampling rate of 44.1 kHz, there is 88,200 16 bit samples for each second of data in the time domain (44,100.times.2 stereo channels). This provides 88,200 bits per second which may be used for storing a fragile watermark. A typical 3 minute stereo song could therefore accommodate 1.89 MB of data for a fragile watermark. (The watermark is called fragile, because it is easily removed without greatly sacrificing the quality of the audio data.) 1.89 MB represents an immense capacity relative to the expected size of the typical data to be transmitted in a SecureChannel (100-200 K).

Preferably, the fragile watermark is bound to a specific copy of a specific song, so that "information pirates" (i.e., would-be thieves) cannot detect a watermark and then copy it onto another song in an effort to feign authorization when none exists. A fragile watermark may also contain information which can be utilized by various receivers which might receive the signal being packaged. For instance, a fragile watermark may contain information to optimize the playback of a particular song on a particular machine. A particular example could include data which differentiates an MP3 encoded version of a song and an AAC encoded version of the same song.

One way to bind a fragile watermark to a specific data set is through the use of hash functions. An example is demonstrated by the following sequence of steps:

1.) A digital data set (e.g., a song) is created by known means (e.g., sampling music at 44.1 kHz, to create a plurality of 16 bit data sets). The digital data set comprises a plurality of sample sets (e.g., a plurality of 16 bit data sets).

2.) Information relative to the digital data set (e.g., information about the version of the song) is transformed into digital data (which we will call the SecureChannel data), and the SecureChannel data is then divided into a plurality of SecureChannel data blocks, each of which blocks may then be separately encoded.

3.) A first block of the SecureChannel data is then is encoded into a first block of sample sets (the first block of sample sets comprising—at a minimum—a sufficient number of sample sets to accommodate the size of the first block of Secure Channel Data), for example by overwriting the LSB of each sample in the first block of sample sets.

4.) A hash pool is created comprising the first block of encoded sample sets.

5.) A first hash value is then created using i) the hash pool, ii) a random (or pseudorandom) number seeded using a code that serves to identify the owner of the digital data set, and iii) the SecureChannel data;

6.) The first hash value is then encoded into a second block of sample sets, the second block of sample sets being sufficient in size to accommodate the size of the first hash value.

7.) The second block of sample sets is then added to the hash pool

8.) A second block of the SecureChannel data is then is encoded into a third block of sample sets.

9.) The third block of encoded sample sets is added to the hash pool.

10.) A second hash value is then created using i) the hash pool, ii) a random (or pseudorandom) number seeded using a code that serves to identify the owner of the digital data set, and iii) the SecureChannel data;

11.) The second hash value is then encoded into a fourth block of sample sets.

Steps 7-11 are then repeated for successive blocks of SecureChannel data until all of the SecureChannel data is encoded. Understand that for each block of SecureChannel data, two blocks of content data are utilized. Moreover, for efficiency, one could use a predetermined subset of the samples in the hash pool, instead of the whole block.

Each SecureChannel block may, for example, have the following structure:

```
{
      long    BlockIdentifier;        //A code for the type of block
      long    BlockLength;            //The length of the block
      ...                             //Block data of a length
                                      matching BlockLength
      char    IdentityHash[hashSize];
      char    InsertionHash[hashSize];
}
```

In theory, each SecureChannel block may be of a different type of block (i.e., may begin with a different BlockIdentifier). In operation, a software application (or even an ASIC) may read the BlockIdentifier and determine whether it is a recognized block type for the particular application. If the application does not recognize the block type, the application may use the BlockLength to skip this block of SecureChannel.

Certain block types will be required to be present if the SecureChannel is going to be accepted. These might include an identity block and a SecureChannel hash block. The SecureChannel data may or may not be encrypted, depending on whether the data is transfer-restricted (a type of value-adding component, that is, VAC) or simply informative. For instance, user-added SecureChannel data need not be encrypted. A BlockIdentifier may also be used to indicate whether a SecureChannel data block is encrypted or not.

Robust Open Watermark (ROW)

A Robust-Open Watermark may be used to divide content into three categories. (The term "open watermark" is used merely to indicate that the watermark relies on a secret which is shared by an entire class of devices, as opposed to a secure watermark—which is readable only by a single member of a class of devices.) A binary setting may be used, whereby one state (e.g., "1") may be used to identify secure protected content—such as content that is distributed in a secured manner. When the LCS detects a secured status (e.g., by determining that the ROW is "1"), the content must be accompanied by an authenticatable SecureChannel before the content is permitted to enter the LCS Domain (e.g., electronic music distribution or EMD content). The other binary state (e.g., "0") may be used to identify unsecured content, for example, non-legacy media that is distributed in a pre-packaged form (e.g. CD's). When the binary setting is "0", the content may or may not have a SecureChannel. Such "0 content" shall only be admitted from a read-only medium in its original file format (e.g., a 0 CD shall only be admitted if it is present on a Redbook CD medium). On the other hand, if the ROW is absent, then the LCS will understand that the content is "legacy". Legacy content may be admitted, or optionally, may be checked for a fragile watermark—and then admitted only if the fragile watermark is present. It would be possible to permit unfettered usage of legacy content—though again, it is the prerogative of the user who sets up the LCS.

Robust Forensic Watermark

Preferably, a robust forensic watermark is not accessible in any way to the consumer—or to "information pirates." A forensic watermark may be secured by a symmetric key held only by the seller. A transaction ID may be embedded at the time of purchase with a hash matching the symmetric key. The watermark is then embedded using a very low density insertion mask (<10%), making it very difficult to find without the symmetric key. Retrieval of such a watermark is not limited by real-time/low cost constraints. The recovery will typically only be attempted on known pirated material, or material which is suspected of piracy. A recovery time of 2 hours on a 400 MHz PC may, therefore, be reasonable.

Sample Embodiment-Renewability

The system of the present invention contemplates the need for updating and replacing previously-embedded watermarks (which may be thought of generally as "renewing" a watermark). If someone is able to obtain the algorithms used to embed a watermark—or is otherwise able to crack the security, it would be desirable to be able to embed a new watermark using a secure algorithm. New watermarks, however, cannot be implemented with complete success over night, and thus, there inevitably will be transition periods where older SPCS are operating without updated software. In such a transition period, the content must continue to be recognizable to both the old SPCSs and the upgraded SPCSs. A solution is to embed both the original and the upgraded watermarks into content during the transition periods. Preferably, it is the decision of the content owner to use both techniques or only the upgraded technique.

The operation of the system of the present invention is complicated, however, by the presence of "legacy" digital content which is already in the hands of consumer (that is, digital content that was commercially distributed before the advent of watermarking systems) because legacy content will continue to be present in the future. Moreover, pirates who distribute unauthorized content will also complicate matters because such unauthorized copies are likely to be distributed in the same formats as legacy content. As it is unlikely that such unwatermarked content can ever be completely removed, the present system must try to accommodate such content.

Hardware can be configured to read old ROW content and extract the old ROW and insert in the content a new ROW.

While the invention has been particularly shown and described by the foregoing detailed description, it will be understood by those skilled in the art that various other changes in form and detail may be made without departing from the spirit and scope of the invention.

The invention claimed is:

1. A system for protecting digital content against unauthorized copying and distribution, comprising:
 a Satellite Unit (SU) having an SU unique identification, an SU storage unit for storing digital data, and said SU capable of receiving and transmitting digital content;
 a local content server system (LCS);
 an interface to permit the LCS to communicate with said SU;
 said LCS comprising:
 a) a communications port in communication for connecting the system via a network to at least one Secure Electronic Content Distributor (SECD), said SECD capable of storing a plurality of data sets, capable of receiving a request to transfer at least one content data set, and capable of transmitting said at least one content data set in a secured transmission,
 b) a non-transient LCS rewritable storage medium whereby content received from outside the LCS may be stored and retrieved,
 c) a domain processor that imposes rules and procedures for content being transferred between the LCS and devices outside the LCS, thereby defining a first LCS domain, and d) an LCS identification code, and said domain processor permitting the LCS to receive digital content from outside the LCS provided the LCS first determines that the digital content being delivered to the LCS is authorized for use by the LCS;

wherein said LCS determines that the digital content being delivered to the LCS is authorized for use by the LCS by comparing a watermark present in said digital content with an LCS watermark associated with said LCS, thereby making a watermark match determination, and only if said watermark match determination indicates a match then said LCS storing said digital content in said first LCS domain in said non-transient LCS rewritable storage medium in encrypted form, and only if said watermark match determination indicates a mismatch then said LCS rejecting said digital content from said first LCS domain so that said digital content is not stored in said first LCS domain;

said LCS determining if a watermark is present in said digital content, thereby making a watermark determination;

only if said watermark determination indicates no watermark is present in said digital content, said LCS degrading said digital content resulting in degraded digital content and then storing said degraded digital content in encrypted form in said first LCS domain in said non-transient LCS rewritable storage media; and only if said watermark determination indicates a watermark is present in said digital content, said LCS making said watermark match determination;

wherein said LCS is designed to transmit either said digital content stored in said first LCS domain or said degraded digital content stored in said first LCS domain via said interface to said SU;

wherein said SU is designed to watermark the digital content that the SU receives from said LCS with an SU watermark, wherein said SU watermark is unique to said SU;

wherein the SU is designed to play the digital content; transmit the digital content to a player other than the SU; or both.

2. The system of claim 1 wherein said SU generates said SU watermark based in part upon a hash received from said LCS.

3. A method for protecting digital content against unauthorized copying and distribution, using a local content server system (LCS) and a satellite unit (SU), wherein said LCS comprises;

a) a communications port in communication for connecting the system via a network to at least one Secure Electronic Content Distributor (SECD), said SECD capable of storing a plurality of data sets, capable of receiving a request to transfer at least one content data set, and capable of transmitting said at least one content data set in a secured transmission, b) a non-transient LCS rewritable storage medium whereby content received from outside the LCS may be stored and retrieved, c) a domain processor that imposes rules and procedures for content being transferred between the LCS and devices outside the LCS, thereby defining a first LCS domain, and d) an LCS identification code uniquely associated with the LCS, and wherein said domain processor permitting the LCS to receive digital content from outside the LCS provided the LCS first determines that the digital content being delivered to the LCS is authorized for use by the LCS, comprising:

said LCS determining that the digital content being delivered to the LCS is authorized for use by the LCS by comparing a watermark present in said digital content with an LCS watermark associated with said LCS, thereby making a watermark match determination, and only if said watermark match determination indicates a match then said LCS storing said digital content in said first LCS domain in said non-transient LCS rewritable storage medium in encrypted form, and only if said watermark match determination indicates a mismatch then said LCS rejecting said digital content from said first LCS domain so that said digital content is not stored in said first LCS domain;

said LCS determining if a watermark is present in said digital content, thereby making a watermark determination;

only if said watermark determination indicates no watermark is present in said digital content, said LCS degrading said digital content resulting in degraded digital content and then storing said degraded digital content in encrypted form in said first LCS domain in said non-transient LCS rewritable storage media;

only if said watermark determination indicates a watermark is present in said digital content, said LCS making said watermark match determination;

wherein said Satellite Unit (SU) has an SU unique identification, an SU storage unit for storing digital data, and said SU is capable of receiving and transmitting digital content;

said LCS transmits either said digital content stored in said first LCS domain or said degraded digital content stored in said first LCS domain via an interface to said SU;

said SU watermarking the digital content that the SU receives from said LCS with an SU watermark, wherein said SU watermark is unique to said SU; and wherein the SU is designed to play the digital content; transmit the digital content to a player other than the SU; or both.

4. A system comprising a local content server system (LCS) and a satellite unit (SU), wherein:

said SU comprises an SU unique identification, an SU storage unit for storing digital data, and wherein said SU is capable of receiving and transmitting digital content;

said LCS comprises an LCS communications port, an LCS storage unit for storing digital data in non-transient form, an LCS domain processor for processing digital data; and an LCS identification code;

wherein said LCS is configured to use said LCS domain processor to impose rules and procedures to control transfer of first content from outside said LCS into a first LCS domain of said LCS, thereby defining said first LCS domain;

wherein said rules and procedures comprise said LCS determining if said first content is verified as authentic or not authentic, and wherein only if said LCS determines that said first content is verified as authentic then said LCS stores said first content in said LCS domain in said LCS storage unit in encrypted form;

wherein only if said LCS finds no indicia indicating either authenticity or lack of authenticity then said LCS degrades said first content resulting in degraded first content and stores said degraded first content in said LCS domain in said LCS storage unit wherein said LCS is designed to transmit either said first content stored in said first LCS domain or said degraded first content stored in said first LCS domain via an interface to said SU;

wherein said SU is designed to watermark the first content that the SU receives from said LCS with an SU watermark, wherein said SU watermark is unique to said SU; and wherein the SU is designed to play the first content; transmit the first content to a player other than the SU; or both.

5. The system of claim 4 wherein said SU generates said SU watermark based in part upon said SU unique identification.

6. The system of claim 4 wherein said SU generates said SU watermark based in part upon a hash received from said LCS.

7. The system of claim 4 wherein said LCS comprises a watermark extractor for extracting a watermark indicating either authenticity or lack of authenticity.

8. The device system of claim 4 wherein said LCS is configured to generate the watermark it embeds into data it transmits, based upon (1) information received by said LCS from said satellite unit (SU) and (2) information about said LCS.

9. The system of claim 4 wherein said LCS is configured to use said LCS domain processor to apply a decode algorithm to said first content, and to determine if encoding is present in said first content based upon results of applying said decode algorithm.

10. The system of claim 9 wherein if said LCS determines that no encoding is present said LCS is configured to degrade said first content prior to storing said first content in said LCS storage.

11. The system of claim 9 wherein if said LCS determines that no encoding is present then said LCS is configured to set a status value to legacy, and apply said rules and procedures associated with a legacy status, to said first content, wherein legacy status means that said LCS did not detect encoding in said first content as a result of application of said decode algorithm.

12. The system of claim 9 wherein if said LCS determines that encoding is present based upon said results of applying said decode algorithm, said LCS is configured to not set a status value to legacy, and to not apply said rules and procedures associated with legacy status, to said first content.

13. The system of claim 9 wherein if said LCS determines that encoding is present, said LCS is configured to set a status value to one of authorized and denied based upon said results of applying said decode algorithm, and to apply said rules and procedures associated with the corresponding one of authorized and denied status.

* * * * *